United States Patent [19]
Fukada et al.

[11] Patent Number: 5,736,061
[45] Date of Patent: Apr. 7, 1998

[54] SEMICONDUCTOR ELEMENT MOUNT AND PRODUCING METHOD THEREFOR

[75] Inventors: Tsuyoshi Fukada, Aichi-gun; Yasutoshi Suzuki, Okazaki; Koushu Satoh; Hiroaki Kawashima, both of Chiba, all of Japan

[73] Assignees: Nippondenso Co. Ltd., Kariya; Iwaki Glass Co., Ltd., Funabashi, both of Japan

[21] Appl. No.: 671,536

[22] Filed: Jun. 27, 1996

[30] Foreign Application Priority Data

Jun. 29, 1995 [JP] Japan ................................. 7-164169

[51] Int. Cl.[6] ........................................................... B44C 1/22
[52] U.S. Cl. ............................. 216/33; 216/53; 216/56; 216/97
[58] Field of Search ........................... 156/629.1, 630.1, 156/633.1, 657.1, 644.1; 216/33, 52, 53, 56, 90, 91, 97, 39; 438/691, 747, 756

[56] References Cited

U.S. PATENT DOCUMENTS 3,951,707   4/1976   Kurtz et al. ..................... 156/630.1
4,833,920   5/1989   Knecht et al. .
5,395,481   3/1995   McCarthy ....................... 156/630.1

FOREIGN PATENT DOCUMENTS 4-083733   3/1992   Japan .
5-047393   12/1993   Japan .

*Primary Examiner*—William Powell
*Attorney, Agent, or Firm*—Cushman Darby & Cushman IP Group of Pillsbury Madison & Sutro LLP

[57] ABSTRACT

A semiconductor sensor mount is formed as follows: through holes are formed that penetrate a glass plate; and then the glass plate having the through holes is dipped into hydrofluoric acid etchant to smooth the inner peripheral surfaces of the respective through holes. By etching the inner peripheral surfaces of the respective through holes after the through hole formation, minute roughness and cracks formed on the inner peripheral surfaces are removed, and thereby the areas for adsorbing gas are substantially reduced. That is, vacuums within the through holes can be maintained at a high degree during the anodic bonding, whereby undesirable electric discharge phenomena are prevented even if a relatively high voltage is applied during the anodic bonding. Accordingly, the yield of products can be improved while improving productivity.

28 Claims, 6 Drawing Sheets

GLASS

GLASS

SEMICONDUCTOR ELEMENT MOUNT AND PRODUCING METHOD THEREFOR

CROSS REFERENCE TO RELATED APPLICATION

This application is based upon and claims the benefit of priority from the prior Japanese Patent Application No. 7-164169 filed on Jun. 29, 1995, the contents of which are incorporated herein by reference.

BACKGROUND OF THE INVENTION

1. Field of the Invention

The present invention generally relates to a semiconductor element mount to which a semiconductor element is anodically bonded. The mount according to the present invention is applicable to a semiconductor sensor for measuring pressure, acceleration, etc., for example, in which a semiconductor sensor element is anodically bonded to the mount.

2. Related Arts

Some conventional semiconductor sensors for measuring pressure are provided with a glass-made mount which is to be anodically be bonded to a semiconductor sensor element. In such a mount is provided a through hole which opens to the anodically bonded surface and communicates with a diaphragm of the semiconductor sensor element.

A technique has been developed by which thermal stress can be eased by utilizing a mount made of a material having a coefficient of thermal expansion that is almost equal to that of the semiconductor sensor element. Namely, as disclosed in the Japanese Unexamined Patent Publication No. 4-83733 and the Japanese Utility Model Publication Laid-open No. 5-47393, recently the mount has been made of alumina-silicate family glass (aluminosilicate glass) or the like with a coefficient of thermal expansion more approximate to that of silicon.

SUMMARY OF THE INVENTION

However, the present inventors found that the above-described conventional mount often induced unexpected breakage of the semiconductor sensor element when such sensors were actually made and used. That is, by the inventors observed that the semiconductor sensor elements were often broken by electric discharges caused inside the through holes in the respective mounts when the glass disc for the mounts was being anodically bonded to the semiconductor wafer for the sensor elements within a vacuum. As this problem adversely affects the yield of products and the man-hour cost, which is consequently reflected in the price of semiconductor sensors, it has been important to find a solution.

In view of the above problem, it is the primary object of the present invention to provide a semiconductor element mount which can preclude the above-described electric discharges during anodic bonding with the semiconductor element, whereby the yield of products can be improved, and to provide a manufacturing method for such semiconductor element mount.

A semiconductor element mount according to the present invention has a glass part to which is anodically bonded a semiconductor element such as a semiconductor sensor element, wherein the glass part has a physically processed structure, such as a through hole, the surface of which is chemically processed to be smooth.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIGS. 1A through 1C are views illustrating manufacturing procedures for forming a flat plate that will form individual sensor mounts according to the first embodiment, wherein FIG. 1A is a cross-sectional view illustrating the shape of a glass plate to be used as a base material of a mount; FIG. 1B is a cross-sectional view illustrating the shape of the glass plate processed by the honing method; and FIG. 1C is a cross-sectional view illustrating the shape of the glass plate mirror finished on one side thereof;

FIGS. 3A and 3B are views illustrating a preparation method for specimens for use in observing the state of the inner peripheral surface of the through hole, wherein FIG. 3A is a perspective view illustrating a specimen cut out of the glass plate; and FIG. 3B is a perspective view illustrating a specimen including the through hole cut in half in the longitudinal direction;

FIGS. 4A and 4B are views illustrating the effects of etching on the inner peripheral surface of the through hole, wherein FIG. 4A is an illustrative view of a photograph taken around the inner peripheral surface before etching; and FIG. 4B is an illustrative view of a photograph taken around the inner peripheral surface after etching;

DETAILED DESCRIPTION OF THE PREFERRED EMBODIMENTS

Figure 1A:
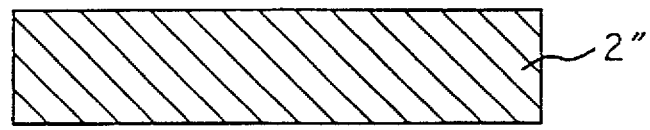

Features and characteristics in a case where the present invention is applied to a mount for a semiconductor sensor element will now be described as follows.

A semiconductor sensor mount according to the present invention is characterized in that at least a surface part forming a surface to be anodically bonded to a semiconductor sensor element is provided with a through hole opening therefrom and is made of glass, and that an inner peripheral surface of the through hole is made smooth by etching.

By the above construction, since the inner peripheral surface of the through hole is smoothened by etching, minute projections or fine cracks on the inner peripheral surface of the through hole are removed. Therefore, the surface area of the inner peripheral surface of the through hole, which adsorbs gases, etc., can be made extremely small. As a result, when the semiconductor sensor mount is placed in a vacuum chamber in the anodic bonding process, the degree of the vacuum within the through hole will not be degraded due to the emission of gas from the inner peripheral surface.

Accordingly, a semiconductor sensor element can be prevented from being broken by an electric discharge caused within the rarefied gas due to the degradation of the degree of the vacuum within the through hole when the mount is being anodically bonded to the semiconductor sensor element. Therefore, a high voltage can be applied during the anodic bonding process, whereby the yield of products and the productivity can be improved. As a result, the semiconductor sensors can be provided at a lower price.

In the above construction, it is preferable that the surface roughness of the inner peripheral surface is selected such that a difference of levels between a convex part and a concave part adjacent to each other is 5 µm or less on an average. In a case where the roughness of the inner peripheral surface of the through hole is limited to 5 µm or less, since the smoothness thereof becomes extremely high, the adsorbing area which determines the gas adsorption capacity can be limited almost to the area of the inner peripheral surface. Therefore, the amount of the rarefied gas emitted from the inner peripheral surface of the through hole at a time of anodic bonding process is extremely limited, which prevents the occurrence of the electric discharge at a sufficiently high reliability.

In the case in which the semiconductor sensor element is made of silicon, the glass used may be aluminosilicate glass.

That is, it is preferable that a material used for the mount should have a coefficient of thermal expansion that approximates, (within ±20%), the coefficient of thermal expansion of the semiconductor sensor element. Particularly, it is important for the material of the mount to have such a coefficient of thermal expansion that will not cause thermal stress which would adversely affect the sensor characteristics within the temperature range in which the semiconductor sensor element is used.

In case the glass, which is a part of the mount anodically bonded to the sensor element, is made of aluminosilicate glass, the mount has a coefficient of thermal expansion approximately equal to that of the material of the semiconductor sensor element, i.e., silicon. According to this, the thermal stresses between the mount and the semiconductor sensor element anodically bonded thereto are decreased and no such stress that would adversely affect the sensor characteristics is caused around the bonded surface. As a result, errors due to the thermal stress can be reduced, whereby the measurement precision can be increased.

It should be noted here that in the above construction, it is assumed that silicon is used for the semiconductor sensor element. However, if the semiconductor sensor element is made of other materials, it is preferable that the mount should be made of a material from the glass or other material which conforms to the coefficient of thermal expansion and bondability of the material of the semiconductor sensor element.

The semiconductor sensor mount of the present invention may be structured such that the mount has a multi-layer structure comprising a glass layer forming the surface part and a semiconductor layer anodically bonded to the bottom surface of the glass layer opposite to the surface part thereof. In this case, as the glass layer functions as a bonding material to be anodically be bonded to the semiconductor sensor element, the glass layer is sufficient with a thickness sufficient for the anodic bonding, and therefore, the glass layer may be made of an extremely thin glass plate. Further, it can be assumed that the semiconductor layer with a coefficient of thermal expansion equal to the coefficient of thermal expansion of the semiconductor sensor element is anodically bonded to the semiconductor sensor element through the extremely thinglass plate. Therefore, even if the thin glass plate induces thermal stress to the semiconductor on both sides thereof, the induced stresses are negligible. As a result, little thermal stress is caused between the semiconductor sensor element and the mount, whereby measurement errors due to thermal stress are avoided.

As the semiconductor layer, which is the thicker layer in the multi-layered mount, a silicon wafer can be used when the semiconductor sensor element is made from silicon. Of course, if the semiconductor sensor element is made of other materials (e.g., germanium), the same material as that of the semiconductor sensor element or a material conformable thereto in view of the coefficient of thermal expansion and bondability may be used instead of silicon as a material of the semiconductor layer.

The above description has been made on the structural features of the semiconductor sensor mount, and now the following will describe a manufacturing method for such a semiconductor sensor mount together with characteristic features thereof.

A manufacturing method for a semiconductor sensor mount according to the present invention is characterized by the steps comprising of: preparing a member which will form a mount for a semiconductor sensor element and has a glass-made surface to be anodically bonded to the semiconductor sensor element; forming a through hole opening in the glass-made surface; and etching at least a glass-made part of the inner peripheral surface of the through hole.

In the manufacturing method described above, as at least the glass-made part of the inner peripheral surface of the through hole is etched, minute projections or fine cracks existing on the inner peripheral surface of the through hole are removed by erosion. As a result, only by adding a simple process, i.e., etching, the mount (or a member, e.g., a flat plate forming the mount) can be provided with a through hole having the inner peripheral surface extremely and microscopically smooth.

Therefore, the surface area of the inner peripheral surface of the through hole, which adsorbs gases, etc., can be made extremely small. As a result, when the semiconductor sensor mount is placed in a vacuum chamber in the following anodic bonding process, the emission of gas from the inner peripheral surface of the through hole can be markedly reduced, whereby a high degree of vacuum within the through hole can be maintained. Accordingly, the electric discharge caused within the rarefied gas can be prevented even when a high voltage is applied during the anodic bonding process, whereby the breakage of the semiconductor sensor element due to the electric discharge can be prevented.

As described above, the fraction of defective products can be substantially decreased in the anodic bonding process. In addition, as the anodic bonding can be performed under a high voltage, the manufacturing time required for the anodic bonding is shortened, whereby improvement of productivity and cost reduction can be achieved simultaneously.

Herein, the etching step may be performed by dipping the member for the mount in a hydrofluoric acid etchant. Using a relatively inexpensive hydrofluoric acid as an etchant improves the etching efficiency, and leads to cost reduction as well.

The etching amount of the inner peripheral surface removed by the etching step may preferably be 10 µm or more. When the etching amount is 10 µm or more, the minute projections or fine cracks existing on the inner peripheral surface of the glass-made part of the through hole can almost be removed. As a result, the inner peripheral surface can be made highly smooth, whereby the area for adsorbing gas molecules, etc. can be reduced to be almost equal to the area of the inner peripheral surface. Therefore, almost no gas is emitted from the inner peripheral surface of the through hole during the anodic bonding, and the anodic bonding is performed while keeping a high degree of vacuum within the through hole. Accordingly, even though a high voltage is applied, the occurrence ratio of electric discharge can further be reduced, whereby the anodic bonding can be performed with a lower fraction which are defective and a higher operational efficiency. As a result, the further improvement of productivity and cost reduction can be achieved.

Here, the etching amount refers to the thickness removed by the etching as the difference between the height of a convex surface before etching and the height of the same convex surface after etching.

Next, preferred embodiments of semiconductor sensor mounts and manufacturing methods therefor will be described in detail with reference to the accompanying drawings.

First Embodiment

A semiconductor sensor mount of a first embodiment will now be described in detail with a manufacturing method therefor.

The manufacturing method of the semiconductor sensor mount according to the first embodiment employs as a base material a glass plate 2" made of an aluminosilicate glass plate 3.0 mm thick cut to the prescribed size, as illustrated in FIG. 1A.

The aluminosilicate glass used was composed mainly of 60 wt. % of silicon oxide, 15 wt. % of alumina, 10 wt. % of zinc oxide, some percentage of boron oxide, magnesium oxide and sodium oxide, respectively, and 1 wt. % of other substances. The characteristics of each type of aluminosilicate glass, such as the composition and the coefficient of thermal expansion, are described in detail in the Japanese Unexamined Patent Publication No. 4-83733 entitled "Glass for Silicon Pedestal."

Figure 1B:
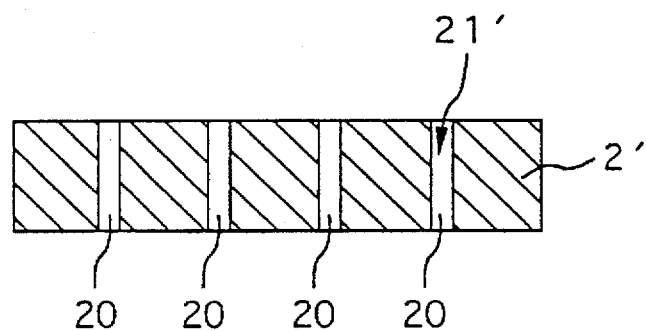

Firstly, as illustrated in FIG. 1B, in the glass plate 2" cut as illustrated in FIG. 1A are formed, by means of ultrasonic honing, a plurality of through holes 20 perpendicular to the top and bottom surfaces of the glass plate 2" and arranged checkeredly at the prescribed intervals. Through this process, the glass plate 2" is transformed into a hole-provided glass plate 2'. Here, the opening and cross section of respective through holes 20 are circular, and each through hole 20 is defined by a columnar inner peripheral surface 21' of the hole-provided glass plate 2'. The diameter of the through hole 20 formed was 0.8 mm.

Figure 2:
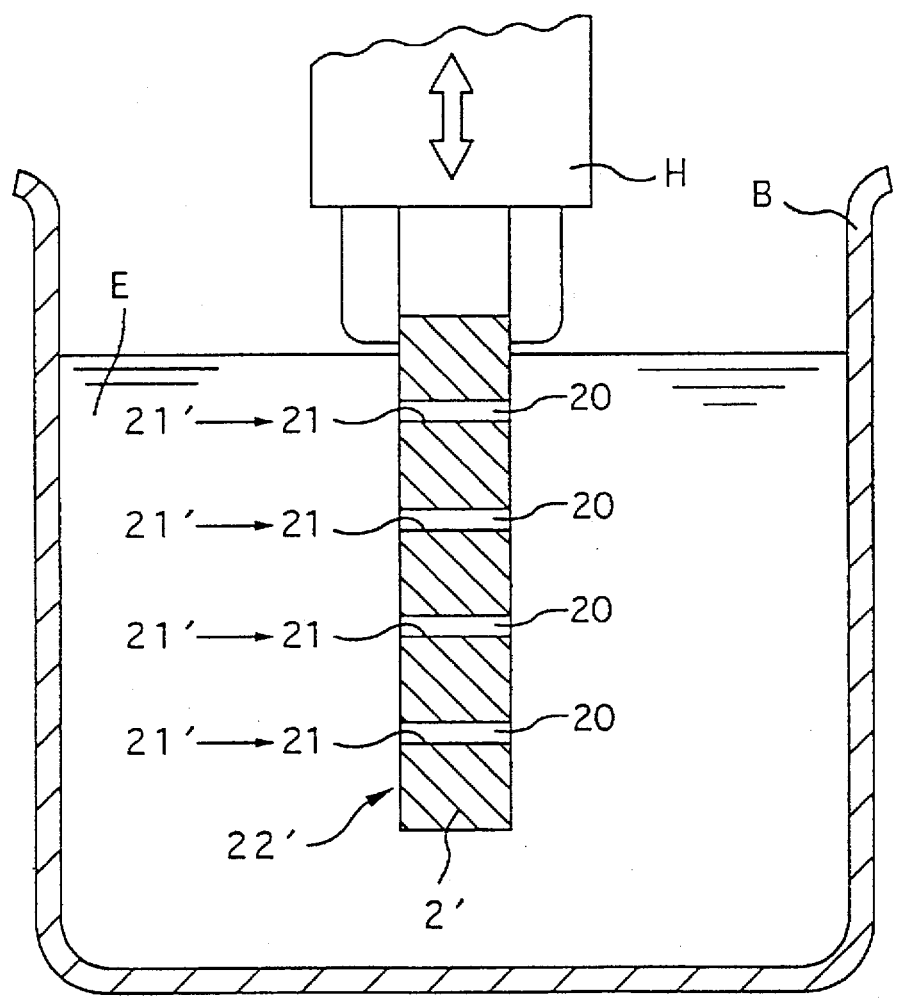
FIG. 2 is a schematic view illustrating procedures for etching.

Secondly, the hole-provided glass plate 2' is dipped in an etchant E for etching as illustrated in FIG. 2. Specifically, the hole-provided glass plate 2' supported on both sides by a holding device H is dipped in the etchant E filled in a corrosion resistant bath B and then repeatedly and suitably lifted above and lowered below the liquid level of the etchant E. Here, the etchant E is hydrofluoric acid (the solution of hydrogen fluoride HF) with a weight concentration of 3% and a temperature of 25° C. Whether the etchant E completely fills the through holes 20 is visually checked through an observation window (not illustrated).

An etching rate under these conditions of approximately 1 μm per minute was obtained. By controlling the etching time, the inner peripheral surfaces 21 of the respective through holes 20 can be formed at any etching rate according to the controlled etching time.

Figure 1C:
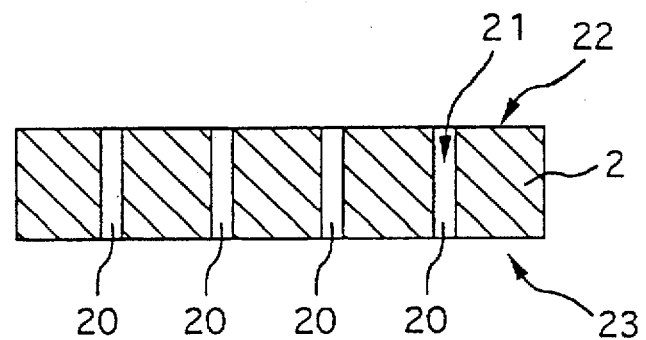

After the etching described above is completed, the respective through holes 20 of the resultant hole-provided glass plate 2 are defined by the etched inner peripheral surfaces 21. Next, on the respective surfaces of the hole-provided glass plate 2, mirror polishing and lapping are performed to form a mirror-finished anodic bonding surface 22 on the top surface and a lapped surface 23 on the bottom surface as illustrated in FIG. 1C.

On the lapped surface 23 is a vapor deposited metal film to improve electrical contactability with a metal electrode or a carbon stage as the electrode in the anodic bonding process described later.

As described above, now the hole-provided glass plate 2 of aluminosilicate glass is completed, having the inner peripheral surfaces 21 forming the respective through holes 20 which are highly smooth and have little roughness or cracks. Here, the thickness of the hole-provided glass plate 2, i.e., the distance between the anodic bonding surface 22 and the lapped surface 23, which are parallel to each other, has been reduced such that it is 2.5 mm.

In the above method of production since, the most important point in embodying the present invention lies in etching, any other manufacturing step, etc. may suitably be modified, if required.

Accordingly, the diameter, depth (plate thickness), arrangement intervals, arrangement patterns, etc. of the through holes 20 are design items and therefore may freely be modified according to the requirements of design of each semiconductor sensor. In the same way, the boring method for the through holes 20 should not be limited to the ultrasonic honing method.

Furthermore, as illustrated in FIG. 2, the hole-provided glass plate 2' is held in such a way that the axes of the respective through holes 20 are parallel to the level of the etchant E during the etching process. However, the flat plate 2' may also be held in such a way that the axes of the respective through holes 20 are perpendicular or diagonal to the level of the etchant E during the etching process.

In addition, during the etching process, the hole-provided glass plate 2' may not only be lowered below and lifted above the level of the etchant E but also may be swung within the etchant E or shaken through the holding device H so that the fresh etchant E can always and sufficiently flow through the through holes 20. Alternatively, a satisfactory result can also be obtained by directly shaking the etchant E by means of an ultrasonic shaker installed within the bath B of the etchant E or on the wall thereof.

Moreover, the hole-provided glass plate 2 may be made of glass other than the aluminosilicate glass or other material. Similarly, as the etchant E, hydrofluoric acid of concentration or temperature other than the above described or component other than hydrofluoric acid may be used.

If a wafer 3 forming semiconductor sensor elements described later is made of material other than silicon, it is preferable that the hole-provided flat plate forming the mounts should be made of glass or other material conformable to the coefficient of thermal expansion and bondability of the material of the wafer 3.

Next, the state of the inner peripheral surfaces of the through holes in the first embodiment will be explained.

Figure 3A:
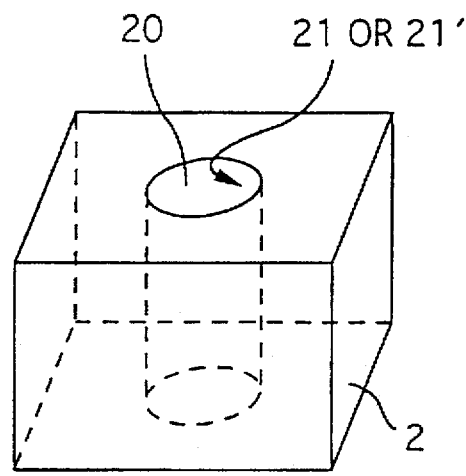
Figure 3B:
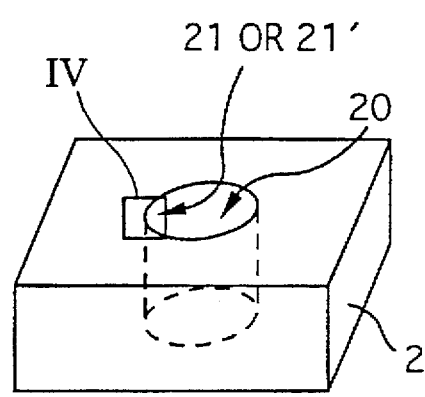

For the purpose of confirming the effects of the above-described etching, as illustrated in FIG. 3A, a rectangular parallelepiped sample including one through hole 20 was cut out of the hole-provided glass plate 2. Then, for the purpose of observing the minute shape of the inner peripheral surface 21 around the longitudinally central part of the through hole 20, as illustrated in FIG. 3B, a specimen was made by transversely cutting sample into two pieces. For the comparison purposes, a reference specimen with no etching was made in the same way.

Figure 4A:
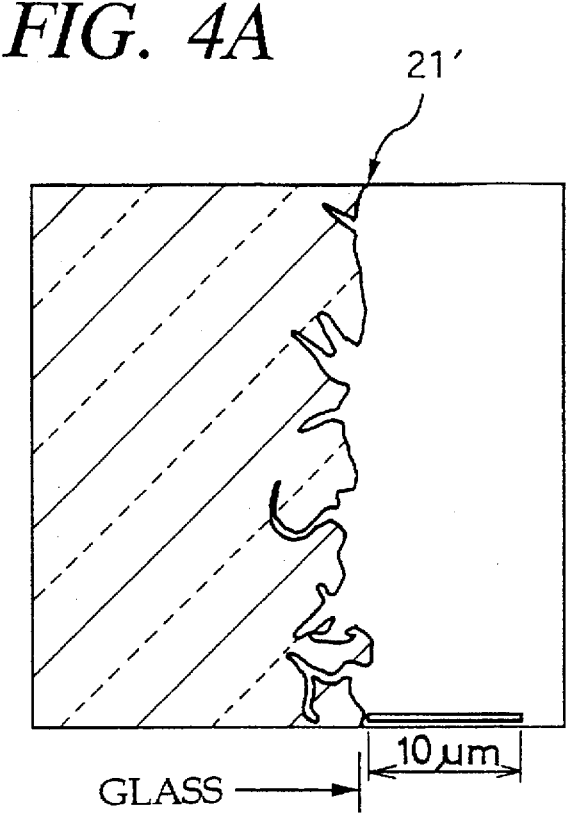
Figure 4B:
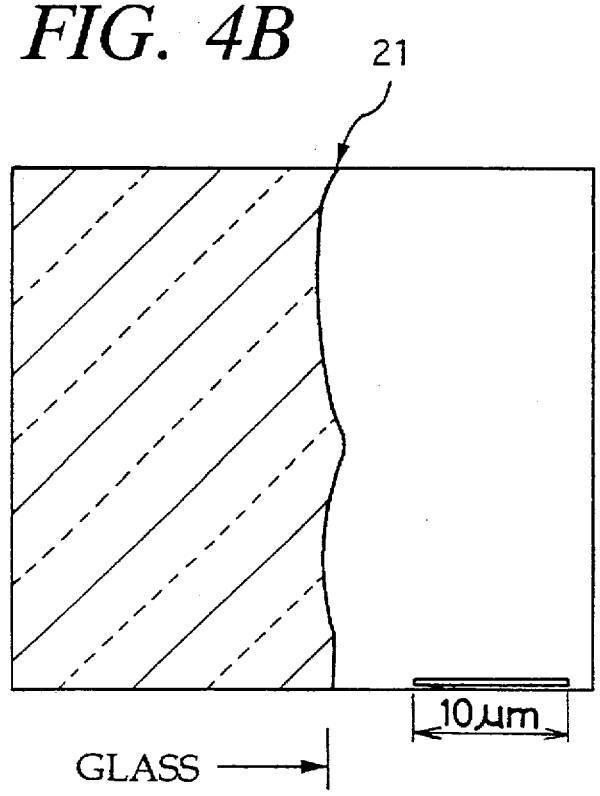

FIGS. 4A and 4B illustrate the cut surface states of the inner peripheral surface 21' of the reference specimen and the inner peripheral surface 21 of the specimen of this embodiment, respectively. The two drawings are the sketches drawn of micrographs of both the specimens, respectively. It can be seen from FIG. 4A that the inner peripheral surface 21' of the reference specimen with no etching, i.e., a surface before HF etching, has small roughness and cracks throughout, providing a large area for adsorbing gas, etc.

On the other hand, it can be seen from FIG. 4B that the inner peripheral surface 21 of the specimen of this embodiment, i.e., a surface after HF etching, is highly smooth with a very gentle roughness and no cracks or the like. Here, FIGS. 4A and 4B also show scale bars indicating a length of 10 μm, respectively. Applying this scale to FIG. 4B, it is clear that the roughness of the inner peripheral surface 21 after etching is made less than 5 μm. Therefore, the adsorbing area formed on the inner peripheral surface 21 of the specimen of the present embodiment is extremely small, and it is presumed that the through hole 20 has almost no ability to adsorb or hold gas, etc.

That is to say, it is verified from the observations conducted by the inventors that, although the through hole 20 is formed physically on the glass plate 2" by an ultrasonic honing method, for example, the inner peripheral surface 21' thereof is made smooth by chemically etching with HF solution; and therefore, undesirable electric discharge due to the degradation of the vacuum degree within the through hole 20 is precluded during the following anodic bonding process, with the result that the hole-provided glass plate 2 according to the present embodiment can form semiconductor sensor mounts with high productivity.

Next, the subsequent production process for semiconductor sensors will be described.

Figure 5:
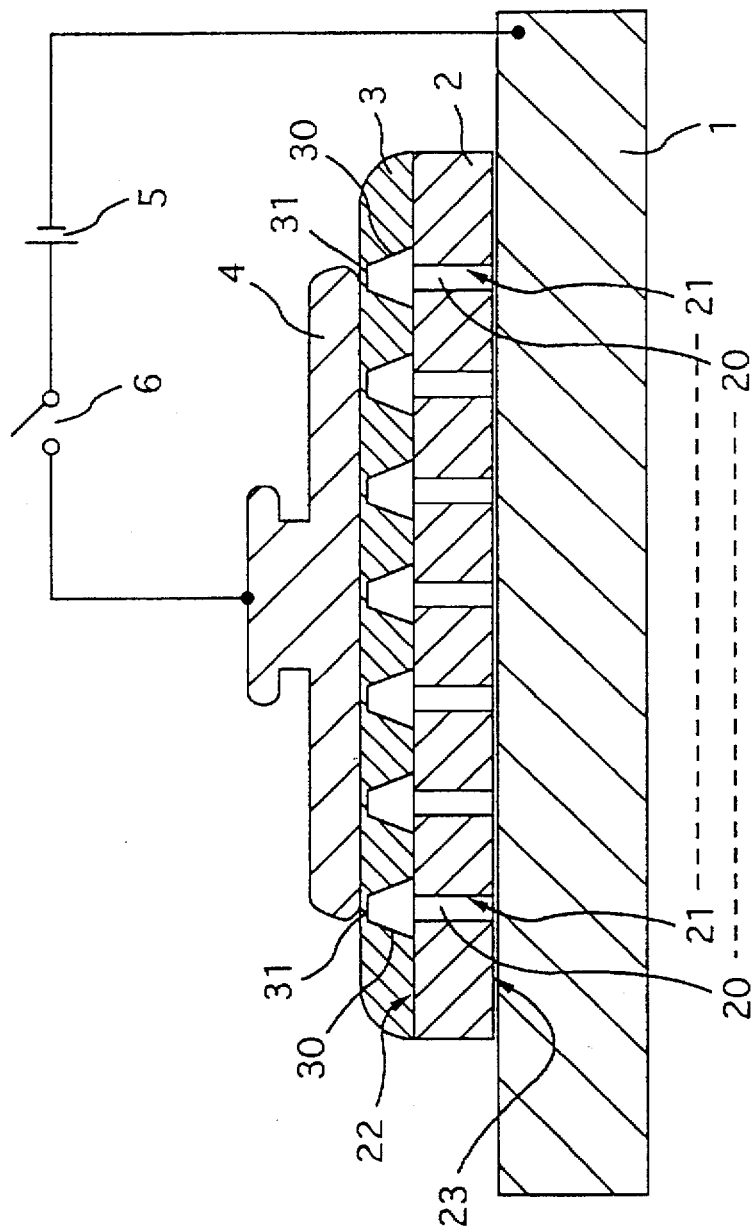
FIG. 5 is a schematic view illustrating a method of anodic bonding between the glass plate and a silicon wafer.

As illustrated in FIG. 5, the hole-provided glass plate 2 manufactured according to the above-described manufacturing method is then anodically bonded to a silicon wafer 3 which is to be fabricated into semiconductor sensor elements, e.g., pressure sensor element in this embodiment.

Specifically, with the lapped surface 23 vapor deposited with a metal film downside, the hole-provided glass plate 2 is placed on the horizontal top surface of a carbon stage 1 which forms a cathode. On the anodic bonding surface 22 which forms the top surface of the hole-provided glass plate 2 is placed the silicon wafer 3 which forms semiconductor sensor elements. Herein, a plurality of concave parts 30 and diaphragms 31 formed in the center parts of the respective concave parts 30 have previously been formed on the silicon wafer 3, and the silicon wafer 3 is placed on the glass plate 2 so that each through hole 20 is positioned to align coaxially with one of the respective concave parts 30 beneath the diaphragms 31 on the silicon wafer 3. On the silicon wafer 3 is placed a stainless steel upper electrode 4 which also functions as a plumb. The bottom surface of the upper electrode 4 is in contact with the top surface of the silicon wafer 3 for electrical conduction.

The stage 1, the hole-provided glass plate 2, the silicon wafer 3 and the upper electrode 4, all stacked as described above, are disposed in a vacuum chamber (not illustrated). The vacuum chamber is evacuated to a vacuum of $5 \times 10^{-6}$ [Torr] ($\approx 7 \times 10^{-4}$ [Pa]), and then anodic bonding is performed as described later. Here, it has empirically been confirmed that electric discharge phenomena frequently occur when the degree of vacuum within the through holes 20 is degraded to around 1 [Torr].

A DC circuit is formed from the stage 1, including a DC power source 5 and a power switch 6 which are connected to each other in series, to the upper electrode 4. When the power switch 6 is turned ON, a high voltage, which is positive based on the stage 1, is applied to the upper electrode 4. At this time, the voltage applied is 1,000 [V], for example, and the time duration of voltage application is 10 minutes, for example.

Then, a large potential difference is generated between the bottom surface of the silicon wafer 3 and the top surface of the hole-provided glass plate 2 of aluminosilicate glass (anodic bonding surface 22), both of which are contact with each other. As a result, negative oxygen ions within the hole-provided glass plate 2 migrate to the wafer 3 and bond to silicon, whereby both the surfaces of the wafer 3 and glass plate 2 in contact with each other are anodically bonded.

In the bonded silicon wafer 3 and glass plate 2, a plurality of concave parts 30 and diaphragms 31, which will form individual sensor elements, communicate with the corresponding through holes 20, respectively. Therefore, by dicing the anodically bonded wafer 3 and hole-provided glass plate 2 into blocks having each through hole 20 in the center thereof, sensor units, each of which is composed of the anodically bonded silicon sensor element and glass-made mount, can be manufactured. Further, instead of dicing, it is also possible to use the anodically bonded wafer 3 and hole-provided plate 2 as a two-dimensional sensor plate with sensor elements laid out over the plane or as an integrated unit of a plurality of sensors.

As described above, semiconductor pressure sensors of this embodiment are produced such that each sensor comprises a mount of aluminosilicate glass having the through hole 20 the inner peripheral surfaces 21 of which is etched using hydrofluoric acid and pressure sensor element which is made from silicon wafer 3 and anodically bonded to the mount.

Figure 6:
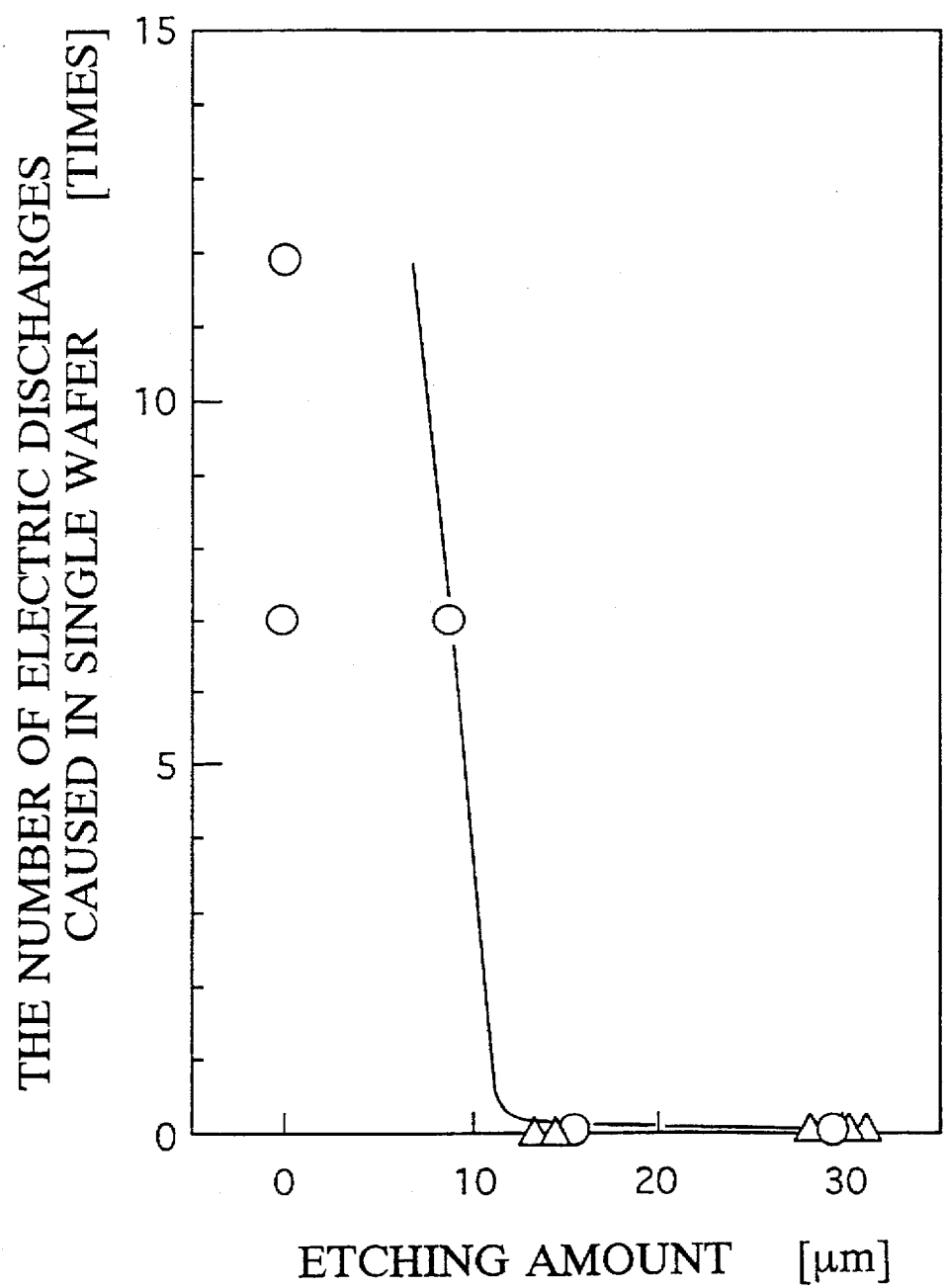
FIG. 6 is a graph showing the relationship between the occurrence of the electric discharges and the etching amount.

With respect to the anodic bonding, as illustrated in FIG. 6, a significant difference was observed in the number of electric discharges according to the provision of etching and the amount of etching.

Precisely, according to the comparative example provided with no etching (the etching amount=0), electric discharge was observed 10 times or so at each anodic bonding, and the diaphragms 31, etc. of the silicon wafer 3 as many as the number of electric discharges observed were destroyed. On the other hand, according to this embodiment in which the inner peripheral surfaces 21 of the respective through holes 20 in the glass plate 2 were provided with etching, the number of electric discharges was substantially reduced. When the etching amount was 10 μm or more, few electric discharges were observed. Specifically, when the etching amount was 7 μm to 8 μm, several electric discharges were still observed, but when the etching amount was 10 μm or more, e.g., 15 μm and 30 μm, no electric discharge was observed.

This result is presumed that, as the inner peripheral surfaces 21 of the respective through holes 20 were made smooth and the adsorbing areas were substantially reduced by etching as described above, vacuums within the respective through holes 20 were maintained when voltage was applied for anodic bonding, and this made it difficult for electric discharge to occur.

As described above, it was proved that by providing the hole-provided flat plate 2 of aluminosilicate glass with etching using hydrofluoric acid, the fraction that are defective due to the occurrence of electric discharges could be lowered even in anodic bonding with the application of a high voltage. Particularly, in the case where the inner peripheral surfaces 21 of the through holes 20 formed by ultrasonic honing were provided with etching and the etching amount was as much as 10 μm or more, the electric discharge phenomena could almost completely be eliminated.

As a result, it was proved that the productivity could be improved and the production cost could be lowered by the present embodiment.

Furthermore, in this embodiment, as the flat plate 2 forming the mounts is made of aluminosilicate glass, the coefficient of thermal expansion of the produced mount can approximate to that of the material of the silicon wafer 3 forming semiconductor sensor elements. According to this embodiment, therefore, the thermal stresses caused between the mount and the corresponding semiconductor sensor element anodically bonded thereto are small, and it is not likely that an excessive stress is applied around the bonded surfaces. As a result, the yield of products can be improved, whereby the product price can further be lowered.

Second Embodiment

Figure 7:
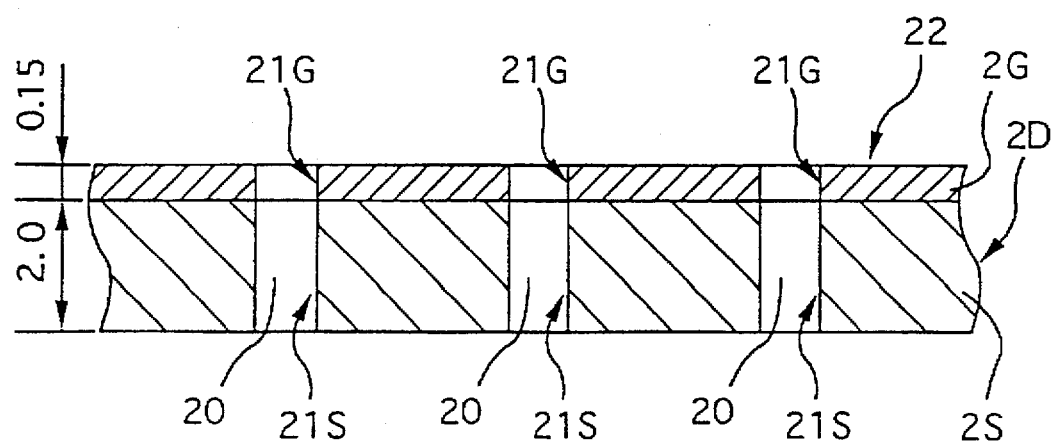
FIG. 7 is a cross-sectional view illustrating the construction of the flat plate of a two-layer structure according to the second embodiment.

In a semiconductor sensor mount and the manufacturing method therefor according to a second embodiment, the flat plate as a material plate of the mount has a two-layer structure as illustrated in FIG. 7. That is, the flat plate is a hole-provided flat plate 2D constructed in two layers; one is a thin glass layer 2G, and the other is a silicon layer 2S anodically bonded to one side of the thin glass layer 2G in a previous process.

The glass layer 2G is made of an aluminosilicate glass plate of 0.15 mm thick, in which the side opposite to the silicon layer 2S has been mirror polished and forms the anodic bonding surface 22. On the other hand, the silicon layer 2S is a wafer made of a silicon monocrystal of 2.0 mm thick. Accordingly, the total plate thickness of the hole-provided flat plate 2D is 2.15 mm.

In the hole-provided flat plate 2D are checkeredly arranged a plurality of through holes 20 formed by the ultrasonic honing method in the same way as the first embodiment. By etching the through holes 20 in the hole-provided flat plate 2D in the same way as the first embodiment, the inner peripheral surfaces 21G in the glass layer 2G are made smooth by removing the roughness by the etching. On the other hand, as the silicon layer 2S is of monocrystal, the inner peripheral surfaces 21S in the silicon layer 2S are inherently smooth with little roughness or cracks.

Accordingly, as there are a few adsorbing areas on the inner peripheral surfaces 21G and the inner peripheral surfaces 21S, both of which forming the respective through holes 20, only a slight amount of gas is adsorbed to or emitted from the through holes 20. Therefore, as in the case of the first embodiment, it is not likely that the vacuums within the respective through holes 20 are degraded and the electric discharge phenomena occur when the hole-provided flat plate 2D is anodically bonded to the silicon wafer 3 forming semiconductor sensor elements (See FIG. 5).

In addition to the effects of the first embodiment, the second embodiment provides peculiar operational effects described below.

In this embodiment, the hole-provided flat plate 2D forming the mount has a multi-layer structure comprising the glass layer 2G and the silicon layer 2S anodically bonded to the glass layer 2G. As the glass layer 2G functions as a bonding material to be anodically bonded to the silicon wafer 3 for the semiconductor sensor elements, the glass layer 2G requires a small thickness necessary only for anodic bonding and, therefore, can be made by an extremely thin glass plate.

Accordingly, in the second embodiment, it can be presumed that the silicon layer 2S, having the same coefficient of thermal expansion as that of the silicon wafer 3 forming semiconductor sensor elements, is anodically bonded to the silicon wafer 3 through the extremely thin glass layer 2G. Here, the thermal stresses caused between the thin glass layer 2G and both the silicon layer 2S and the silicon wafer 3 anodically bonded to the top and bottom sides thereof, respectively, during the anodic bonding process are extremely small. As a result, defects due to thermal stress are prevented, whereby the yield of products can further be improved.

The second embodiment has also been described herein on the assumption that the semiconductor sensor elements are made of silicon. However, if the semiconductor sensor elements are made of other material (e.g., germanium), the same material as that of the semiconductor sensor elements should be used instead of the silicon layer 2S. Alternatively, it is preferable that the thicker layer of the mount composed of a plurality of layers should be made of a material conformable to the coefficient of thermal expansion and bondability of the material of the semiconductor sensor elements.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A manufacturing method for a semiconductor element mount, comprising the steps of:

physically processing a glass-made member for the semiconductor element mount; and chemically etching a surface roughness of the glass-made member caused by the step of physically processing the glass-made member to smoothen a surface of the glass-made member.

2. A method according to claim 1, wherein the chemically etching step includes dipping the glass-made member in a hydrofluoric acid etchant.

3. A method according to claim 2, wherein an etching amount of the physically processed surface by the chemically etching step is selected to be 10 μm or more.

4. A method according to claim 2, wherein the physically processing step includes forming a through hole which penetrates the glass-made member.

5. A method according to claim 4, wherein the through hole is formed by an ultrasonic honing method.

6. A manufacturing method for a semiconductor sensor, comprising the steps of:

preparing a member which forms a mount for a semiconductor sensor element and has a glass-made surface, the preparing step comprising the steps of:

forming a through hole opening onto the glass-made surface;

etching at least a glass-made portion of an inner peripheral surface of the through hole; and anodically bonding a semiconductor wafer which forms the semiconductor sensor element to the glass-made surface of the member forming the mount.

7. A method according to claim 6, wherein the etching step includes dipping at least a glass-made part of the member in a hydrofluoric acid etchant.

8. A method according to claim 7, wherein an etching amount of the glass-made portion of the inner peripheral surface of the through hole by the etching step is selected to be 10 μm or more.

9. A method according to claim 7, wherein the through hole forming step includes forming the through hole by ultrasonic honing method.

10. A manufacturing method for a semiconductor element mount, comprising the steps of:

physically processing a glass-made member for the semiconductor element mount including forming a through hole which penetrates the glass-made member; and chemically etching the physically processed surface of the glass-made member.

11. A method according to claim 10, wherein the chemically etching step includes dipping the glass-made member in a hydrofluoric acid etchant.

12. A method according to claim 10, wherein an etching amount of the physically processed surface by the chemically etching step is selected to be 10 μm or more.

13. A method according to claims 10, wherein the through hole is formed by an ultrasonic honing method.

14. A manufacturing method for a semiconductor element mount according to claim 1, wherein glass forming the glass-made member is aluminosilicate glass.

15. A manufacturing method for a semiconductor element mount according to claim 6, wherein glass forming the member is aluminosilicate glass.

16. A manufacturing method for a semiconductor element mount according to claim 10, wherein glass forming the glass-made member is aluminosilicate glass.

17. A manufacturing method for a semiconductor element mount according to claim 11, wherein the surface roughness of the glass-made member after the step of chemically etching the glass-made member is 5 μm or less.

18. A manufacturing method for a semiconductor element mount according to claim 6, wherein a surface roughness of the member after the step of chemically etching the glass-made member is 5 μm or less.

19. A manufacturing method for a semiconductor element mount according to claim 10, wherein a surface roughness of the glass-made member after the step of chemically etching the glass-made member is 5 μm or less.

20. A manufacturing method for a semiconductor element mount according to claim 1, further comprising:

a step of forming a glass-made member by bonding a glass part to a semiconductor part.

21. A manufacturing method for a semiconductor element mount according to claim 6, further comprising:

a step of forming the member by bonding a glass part to a semiconductor part.

22. A manufacturing method for a semiconductor element mount according to claim 10, further comprising:

a step of forming the glass-made member by bonding a glass part to a semiconductor part.

23. A manufacturing method for a semiconductor element mount according to claim 20, wherein the semiconductor part has a thickness thicker than a thickness of the glass part.

24. A manufacturing method for a semiconductor element mount according to claim 21, wherein the semiconductor part has a thickness thicker than a thickness of the glass part.

25. A manufacturing method for a semiconductor element mount according to claim 22, wherein the semiconductor part has a thickness thicker than a thickness of the glass part.

26. A manufacturing method for a semiconductor element mount according to claim 20, wherein the semiconductor part is made of monocrystalline silicon.

27. A manufacturing method for a semiconductor element mount according to claim 21, wherein the semiconductor part is made of monocrystalline silicon.

28. A manufacturing method for a semiconductor element mount according to claim 22, wherein the semiconductor part is made of monocrystalline silicon.

* * * * *